INVENTORS
Andrew V. Ney
Steven L. Hoffman
BY Williams and Krake
ATTORNEYS

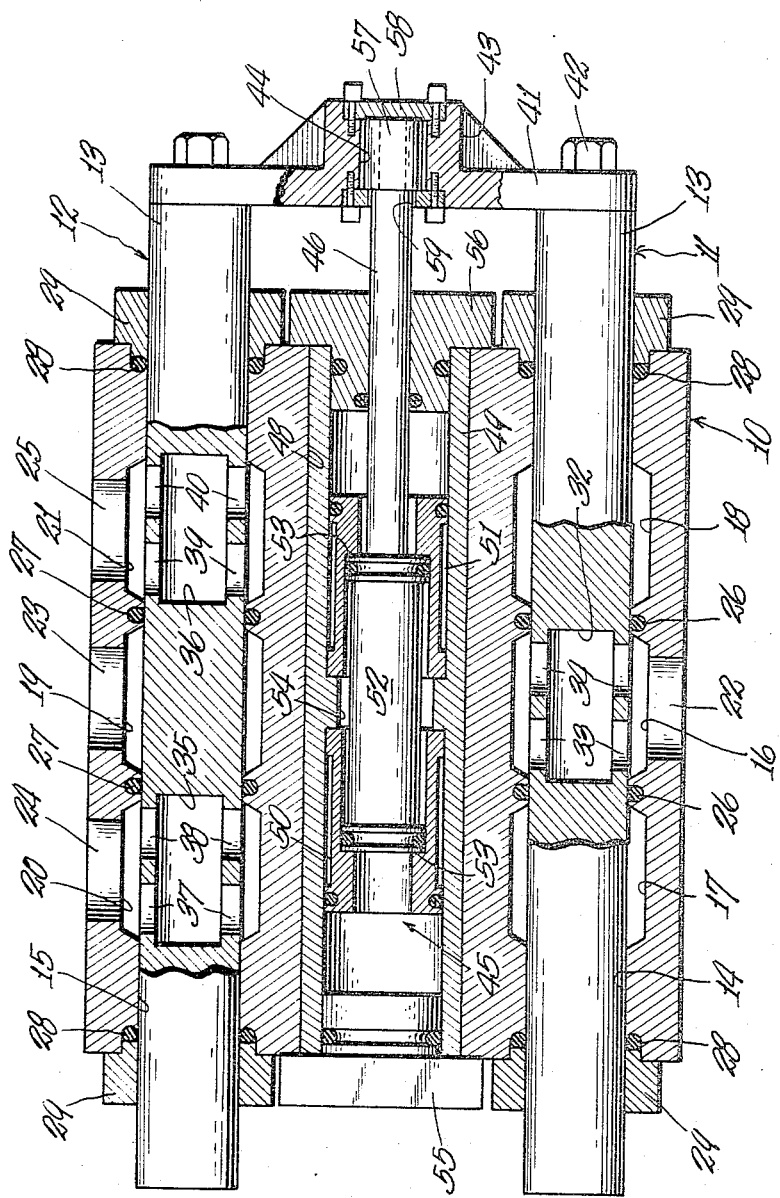

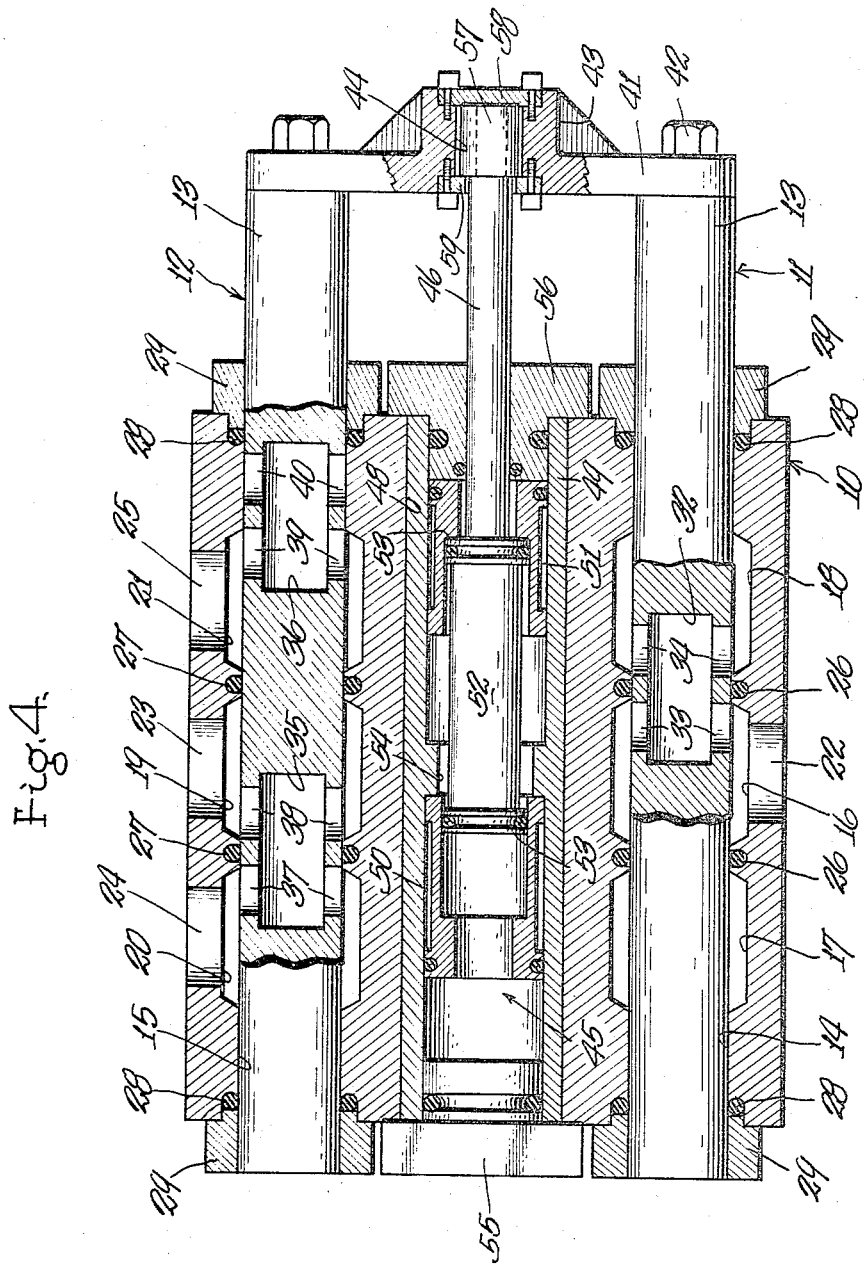

ns of reference characters as before, but

United States Patent Office 3,364,942
Patented Jan. 23, 1968

3,364,942
FLUID PRESSURE OPERATED, FLUID CONTROL VALVE
Andrew V. Ney, Alliance, and Steven L. Hoffman, Salem, Ohio, assignors to Salem Valve Company, Salem, Ohio
Filed Mar. 1, 1966, Ser. No. 530,852
5 Claims. (Cl. 137—596.18)

ABSTRACT OF THE DISCLOSURE

A fluid control valve in which a pair of valve members are disposed in a housing in spaced, side-by-side relation and have portions projecting outwardly of the housing which are connected together for unitary valve member movement. A fluid pressure actuator is disposed in a bore in the housing intermediate the valve members and has a portion projecting outwardly of the housing for connection to the valve members for actuating the same. The fluid pressure actuator bore opens into the housing from opposite ends thereof and the connection between the valve members and the actuator provides for relative movement therebetween in a direction transversely of actuator movement.

Figure 1:
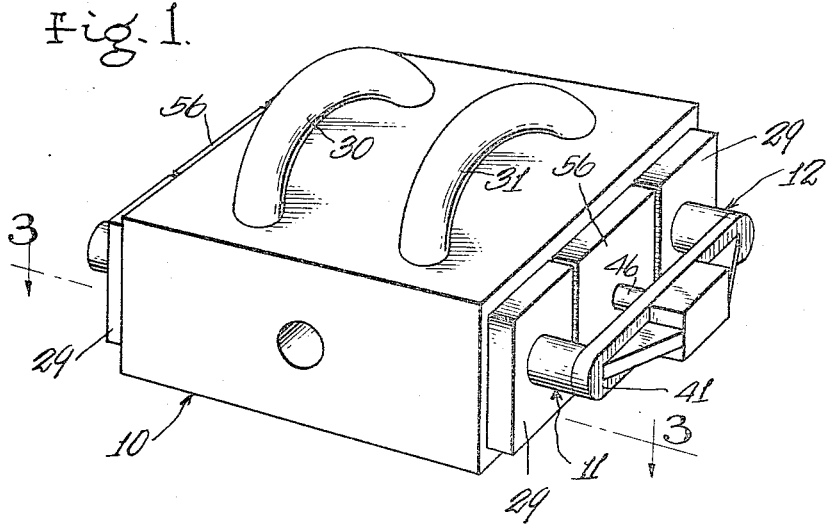

The present invention relates to fluid control valves of the type shifted by fluid pressure, more particularly to valves having a linearly movable valve member in side-by-side relation with a linear fluid actuator, and the principal object of the invention is to provide new and improved valves of the character described.

The present invention is an improvement over prior art devices of the same general type in that it is far more compact and thus requires far less installation space. Moreover, apparatus of the present invention is more easily inspected and its normal wearing parts more easily replaced than is the case of prior art apparatus. These and other advantages will readily become apparent from a study of the following description and from the appended drawings.

Figure 2:
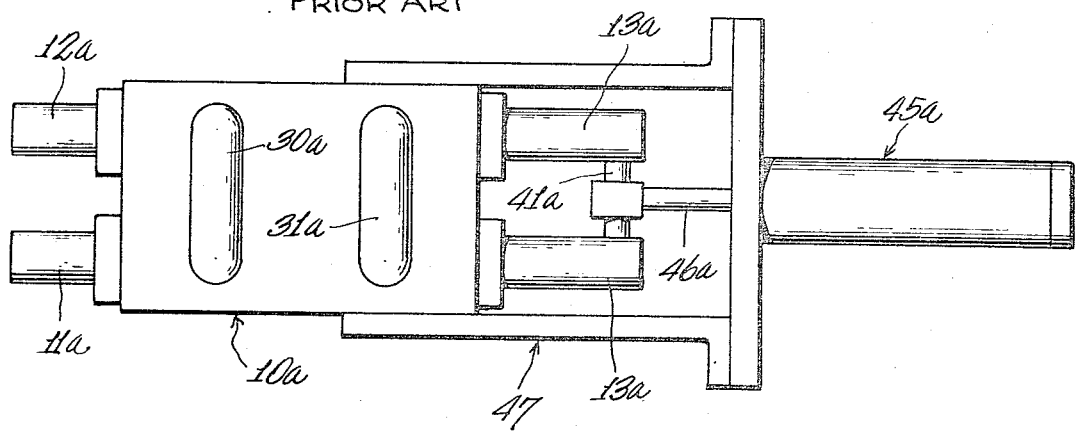

In the drawings accompanying this specification and forming a part of this application there is shown, for purpose of illustration, an embodiment which the invention may assume, and in these drawings:

FIGURE 1 is a perspective view of a valve constructed in accordance with the present invention, FIGURE 2 is a plan view of a prior art valve, FIGURE 3 is an enlarged sectional view generally corresponding to the line 3—3 of FIGURE 1, and FIGURE 4 is a view like FIGURE 3, but with certain parts shown in another position.

Referring to FIGURES 1 and 3, the valve chosen to illustrate the present invention comprises a valve housing 10 in which are disposed a pair of axially shiftable, elongated valve members 11 and 12 in spaced, side-by-side, parallel relation. For a purpose to appear, valve members 11 and 12 project beyond the housing at 13. Each valve member is slidably received within respective bores 14, 15 in the housing, the bore 14 having a central, radial enlargement 16 flanked by radial enlargements 17 and 18, and the bore 15 having a central radial enlargement 19 flanked by radial enlargements 20, 21.

Formed in the housing 10 is an inlet port 22 communicating with the bore enlargement 16, an exhaust port 23 communicating with the bore enlargement 19, and outlet ports 24, 25 respectively communicating with bore enlargements 20, 21. Flanking the bore enlargement 16 and sealably engaging the valve member 11 are suitable annular sealing members 26 which prevent communication between the enlargement 16 and enlargements 17 and 18. Similarly, suitable sealing annular sealing members 27 flank the bore enlargement 19 and sealably engage the valve member 12 to prevent communication between the enlargement 19 and the enlargements 20 and 21.

To prevent fluid leakage about valve members 11, 12 through the ends of their respective bores, suitable annular sealing members 28 engage respective valve members and are maintained in position by suitable apertured caps 29 which may be removably secured to the valve housing 10 in any convenient manner. As seen in FIGURE 1, an external conduit 30 establishes communication between bore enlargements 17 and 20 while an external conduit 31 establishes communication between bore enlargements 18 and 21.

In FIGURE 3, it will be seen that the valve member 11 has an internal cavity 32 intersected by a series of apertures 33, 34 formed in the valve member. Similarly, the valve member 12 has a pair of axially spaced, internal cavities 35, 36 respectively, intersected by a series of apertures 37, 38 and 39, 40. In the position of parts shown, the apertures 33, 34 of valve member 11 are wholly within the bore enlargement 16 while the apertures 37, 38 and 39, 40 of valve member 12 are wholly within respective bore enlargements 20, 21. Thus, it will be seen that in the position of parts seen in FIGURE 3, there will be no communication between bore enlargement 16 (which communicates with inlet port 22) and bore enlargements 17 and 18. Similarly, there will be no communication between bore enlargement 19 (which communicates with exhaust port 23) and bore enlargements 20, 21 (which respectively communicate with outlet ports 24, 25).

If the valve members 11, 12 are simultaneously shifted from the positions seen in FIGURE 3 to the positions seen in FIGURE 4, it will be noted that communication will be established between the bore enlargements 16, 18 via the valve member cavity 32 and its apertures 33, 34. Thus, inlet fluid may flow from the inlet port 22 through the outlet port 25 via the bore enlargement 18, the external conduit 31 and the bore enlargement 21. At the same time, communication will be established between the bore enlargements 19, 20 via the valve member cavity 35 and its apertures 37, 38. Thus, fluid may flow in the outlet port 24 and out of the exhaust port 23 via the bore enlargement 20 and the bore enlargement 19.

In the event the valve members are shifted to the left from the position seen in FIGURE 3 rather than to the right as seen in FIGURE 4, communication will be established between the bore enlargements 16, 17 and between the bore enlargements 19, 21 to thus allow inlet fluid to flow out the outlet port 24 and to allow fluid to flow in the outlet port 25 and out the exhaust port 23.

To provide for the aforesaid unitary movement of the valve members 11, 12, a rigid bar 41 extends between the member ends 13 and is removably secured thereto as by means of capscrews 42. For a purpose to appear, the intermediate portion of bar 41 is enlarged at 43 to provide an internal pocket 44.

To effect movement aforesaid of the valve members 11, 12, a fluid cylinder 45 having a piston rod 46 is employed and while the use of a fluid cylinder to operate a valve of the type herein disclosed is not broadly new, the location of such fluid cylinder in the present invention provides a considerable advance in the art as will hereinafter appear.

In the prior-art structure seen in FIGURE 2, parts corresponding to those hereinabove disclosed are identified with the same reference characters as before, but with the suffix *a* added. In this prior art structure, the actuating fluid cylinder 45a is mounted at one end of the valve by a suitable bracket structure 47 with its piston rod 46a secured to the bar 41a for simultaneously shifting the valve members 11a, 12a. While this prior-art structure has functioned satisfactorily, two important disabilities have been inherent therein:

Firstly, since the actuating cylinder is in end-to-end relation with the valve, considerable space is required to accommodate the assembly. Secondly, and of even greater importance, replacement of the seals about piston rod 46a or the seals about the valve member ends 13a necessitates first that the cylinder 45a be separated from the valve 10a to permit seal removal and replacement. It will readily be appreciated that separation of the components aforesaid can be a major, time-consuming operation when the valve and/or the cylinder are of such size that they cannot readily be handled without a hoist or the like.

Returning to FIGURE 3, the valve members 11, 12 are spaced apart far enough to provide a bore 48 for closely but removably receiving a sleeve 49 which constitutes a cylinder barrel. In the present embodiment, the sleeve 49, or cylinder barrel, encloses a three-position piston assembly as will next be described, it being noted that by positioning the cylinder 45 intermediate the spaced-apart valve members 11, 12, a very compact assembly is provided.

Slidable in respective ends of barrel 49 are outer pistons 50, 51 in which is slidable an inner piston 52 from which projects the previously mentioned piston rod 46. The ends of pistons 50, 51 are reduced in size to provide shoulders 53 for abutment with respective ends of the inner piston 52 and the barrel 49 is provided with a reduced size intermediate portion 54 providing shoulders for abutment with respective outer pistons 50, 51. Closing respective ends of cylinder barrel 49 are caps 55, 56 secured in position by any suitable means. Cap 56, of course, is apertured to slidably pass the piston rod 46. For sealing against loss of fluid pressure, suitable seals, such as the illustrated O rings, are carried by the pistons and the cylinder caps aforesaid.

Piston rod 46 has a radially enlarged head 57 received in the previously described pocket 44. For assembly reasons, head 57 may be threaded on a reduced diameter portion of the piston rod so that the head may be removed when necessary. Note that the pocket 44 is somewhat greater in transverse size than the rod head 57 to provide a radial clearance therebetween for a purpose to appear. The head 57 is maintained in the pocket 44 by any suitable means; for example, a cap 58 may be affixed to the bar enlargement 43 for bearing against the outer side of the head 57 while an apertured cap 59 may be affixed to the bar 41 for bearing against the underside of the head 57.

As previously pointed out, since radial clearance exists between the piston rod head 57 and the bar pocket 44, binding of the piston rod 46 will be obviated, despite slight machining errors, since the piston rod may float sideways with respect to the bar 41 when necessary.

In operation, when fluid pressure is admitted to both ends of the cylinder barrel 49 through suitable ports not herein shown but disposed to provide for fluid flow into and out of the cylinder barrel to the left of outer piston 50 and to the right of outer piston 51 respectively, the outer pistons 50, 51 will be forced toward each other against the barrel shoulder portion 54 and, because of engagement of inner piston 52 with the outer piston shoulders 53, the inner piston will be held in the centralized position seen in FIGURE 3. This, of course, will position the valve members 11, 12 in their centralized positions shown.

If fluid pressure is now exhausted from the right-hand end of the cylinder barrel 49, fluid pressure in the left-hand end thereof, acting on the inner piston 52, will move the latter and valve members 11, 12 to the right to the position seen in FIGURE 4 wherein outer piston 51 abuts the end cap 56. Note that in moving to the right, the inner piston will carry with it the outer piston 51.

When the valve is to be returned to the position seen in FIGURE 3, fluid pressure will again be re-admitted to the right-hand end of the cylinder barrel 49. Such fluid pressure, acting against the area of the outer piston 51 and being opposed by the fluid pressure at the left-hand end of the cylinder barrel which, however, acts against the much smaller area of the inner piston, will return the parts to the position seen in FIGURE 3.

In the event the valve is to be shifted in the opposite direction, i.e., to the left from the position seen in FIGURE 3 rather than to the right, as seen in FIGURE 4, fluid pressure at the left end of the cylinder barrel 49 will be exhausted and the inner piston will move to the left, shifting the valve members 11, 12 therewith, until the outer piston 50 abuts the cap 55. To return the parts to the position of FIGURE 3, it is only necessary to re-admit fluid pressure to the left-hand end of the cylinder barrel 49 wherein such pressure, exerted against the outer piston 50 and opposed by the pressure acting against the much smaller area of the piston 52, will shift the parts once again to the position seen in FIGURE 3.

As previously mentioned, it is an advantage of the present invention that accessibility to various wearing parts is simplified. Thus, by removing the bar 41 connecting the valve members 11, 12, the seals 28 at the right-hand end of the members may readily be replaced. Similarly, replacement of the piston rod packing carried by the cylinder barrel plug 56 or the seals carried by outer piston 51 or those of the inner piston 52 may easily be effected once the bar 41 has been removed and the head 57 unscrewed from the piston rod 46.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:

1. In a fluid control valve formed of a housing having inlet, outlet and exhaust ports, a pair of elongated valve members carried by said housing for axial movement and such members controlling fluid flow between certain of said ports, said valve members being disposed in laterally spaced, parallel relation and each projecting outwardly of a housing end, the improvement wherein said housing has bore means disposed intermediate and generally parallel with said valve members, and fluid pressure actuator means reciprocable within said bore means and having a portion extending beyond said one housing end and connected to said valve members for effecting movement thereof, said bore means opening into said housing from opposite ends thereof to provide for assembly and disassembly of said actuator means from respective housing ends.

2. The construction of claim 1 wherein a bridging member extends between the outwardly projecting portions of said valve members and rigidly connects the latter for unitary movement.

3. The construction of claim 2 wherein said fluid actuator means portion is connected to said bridging member and wherein the connection between the latter and said actuator portion provides for relative movement therebetween in a direction transversely of movement of said actuator means to insure against binding of the latter during axial movement thereof despite slight machining errors.

4. The construction of claim 1 wherein said fluid pressure means is of the three-position type for selectively shifting and holding said valve members in either of two extreme positions or in a position intermediate such extreme positions.

5. The construction of claim 4 wherein said fluid pressure means comprises a first pair of pistons axially slidable independently of each other,
   a second piston slidably supported by the pistons of said first piston pair for axial movement independently thereof,
   abutment means in part provided by said second piston and respective pistons of said piston pair and interengageable to provide for unitary movement of said second piston and one of said first pistons during second piston movement in one direction and interengageable to provide for unitary movement of said second piston and the other of said first pistons during second piston movement of the opposite direction,
   a bridging member extending between the outwardly projecting portions of said valve members and connecting the latter for unitary movement,
   and a piston rod extending axially of said second piston to the exterior of said housing and movable with such second piston, said piston rod being associated with said bridging member to provide for unitary movement of said second piston and said valve members.

References Cited
UNITED STATES PATENTS

| | | | |
|---|---|---|---|
| 1,465,742 | 8/1923 | Shipley et al. | 137—596.18 X |
| 2,380,827 | 7/1945 | Downs | 137—595 X |
| 3,097,572 | 7/1963 | Macy | 92—13 |

FOREIGN PATENTS

| | | |
|---|---|---|
| 975,107 | 10/1950 | France. |
| 1,235,484 | 5/1960 | France. |

HENRY T. KLINKSIEK, *Primary Examiner.*